United States Patent

[11] 3,565,222

| [72] | Inventor | Kenji Kimoto<br>3-28, 2-chome, Hatabucho, Shimonoseki<br>Yamaguchi Prefecture, Japan |
|---|---|---|
| [21] | Appl. No. | 769,986 |
| [22] | Filed | Oct. 23, 1968 |
| [45] | Patented | Feb. 23, 1971 |
| [32] | Priority | Nov. 2, 1967, July 13, 1968, July 13, 1968 |
| [33] | | Japan |
| [31] | | 42/70788, 43/49198 and 43/49199 |

[54] CLUTCH
9 Claims, 6 Drawing Figs.

[52] U.S. Cl. ................................................. 192/71;
192/76
[51] Int. Cl. ..................................................... F16d 11/06,
F16d 13/14
[50] Field of Search ........................................... 192/71, 74,
75, 76

[56] References Cited
UNITED STATES PATENTS

| 152,027 | 6/1874 | Watson | 192/76 |
| 760,516 | 5/1904 | Ziegler et al. | 192/76 |
| 1,410,347 | 3/1922 | Pope | 192/71(UX) |
| 1,482,587 | 2/1924 | Smith | 192/71 |
| 1,509,446 | 9/1924 | Skinner | 192/71(X) |
| 1,594,259 | 7/1926 | Hardman | 192/76 |

*Primary Examiner*—Allan D. Herrmann
*Attorney*—Holcombe, Wetherill & Brisebois

ABSTRACT: A clutch comprising a casing having a plurality of depressions in its inner surface, a shaft rotatable with respect to the casing, a plurality of members carried by the shaft for radial movement between a position engaging said depressions and a position clear of said depressions, and means for moving said members between said positions.

PATENTED FEB 23 1971 3,565,222

CLUTCH

SUMMARY OF THE INVENTION

This invention relates to a clutch which comprises a clutch casing having a plurality of depressions arranged in a series on its inside surface and a rotatable shaft having a plurality of movable projecting members supported thereon, said movable projecting members being so disposed with respect to said depressions that they can be engaged in or disengaged from said depressions.

Functionally speaking, conventional clutches may be broadly classified into dog clutches and frictional clutches. Clutches of the former type cannot be engaged or disengaged unless they are at rest or rotating slowly, and they are difficult to disengage when rotating under a load. Clutches of the latter type which utilize frictional force, are heavy in proportion to their power transmitting ability and are liable to slip during operation. In the dry type, the ability to transmit power is reduced by half when water or oil adheres to the contact surface.

At the same time, the shaft centering must be perfect; even the slightest eccentricity generates great frictional heat or causes vibration. Moreover, substantial force must be applied to engage or disengage such clutches, and to reduce this force, a complicated mechanism is required.

The primary object of this invention is to provide a clutch free from the above drawbacks, which can reliably transmit the rotation of a driving shaft to a driven shaft or to a pulley rotatably mounted on the driving shaft.

Another object of this invention is to provide a clutch combining the advantages of both the dog clutch and the frictional clutch, namely, the absence of slippage between the driving and driven members characteristic of the former and the smoothness in the connection or disconnection of power which is characteristic of the latter.

Still another object of this invention is to provide a clutch in which the power can be connected or disconnected by exerting an extremely small force, the member which engages the clutch-casing with the driving shaft being rotated within the plane including the axis of the driving shaft or sliding within a plane vertical to the axis of the driving shaft.

Other objects and advantages of this invention will be better understood from the following description of several embodiments of this invention, with reference to the attached drawings, in which.

FIRST EMBODIMENT ILLUSTRATED IN FIGS. 1 AND 2

Figure 1:
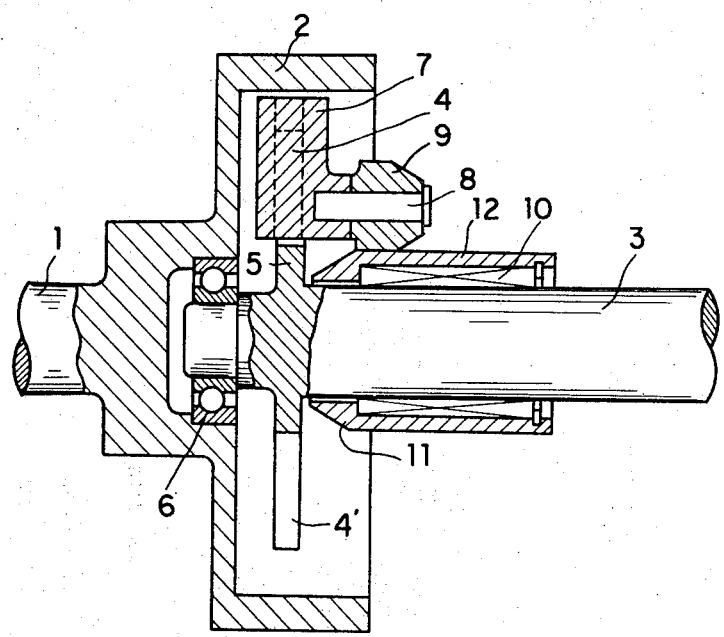
FIG. 1 is a longitudinal sectional view of a clutch with one projecting member removed.
Figure 2:
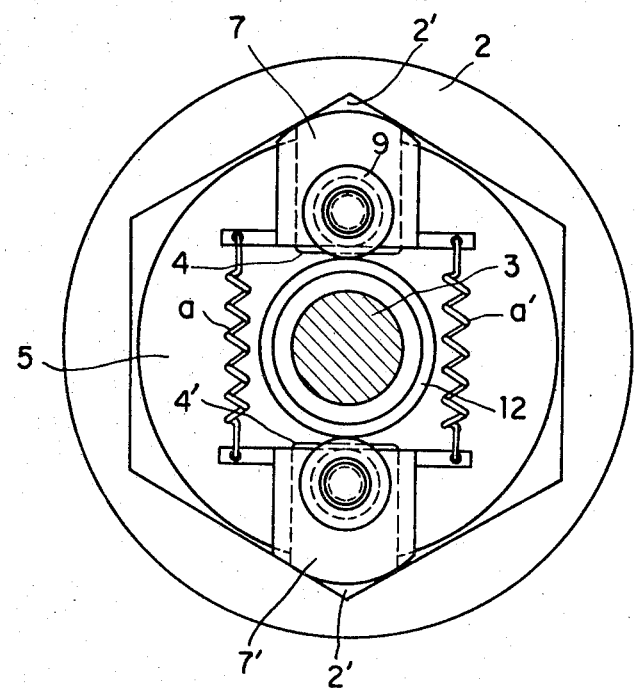
FIG. 2 shows a side view of the clutch shown in FIG. 1.

A clutch-casing 2 having a polygonal inner surface is fixed to the end of a driven shaft 1. A disc 5 pierced by a plurality of slots 4, 4' is fixed to the end of a driving shaft 3 and the tip of said shaft 3 is supported through the bearing 6 in the clutch-casing 2 (or may be unsupported, depending on the casing). Said slots 4, 4' slidably engage the projecting members 7, 7' which carry at one side of said slots externally tapered rollers 9 supported by pins 8. The rollers 9 are in contact with the shifting tube 12 which is mounted by means of a roller bearing 10 on the driving shaft 3 and has a taper 11 at its outer end. The projecting members 7, 7' are biased radially inward by the springs $a, a'$.

In this clutch, movement of the shifting tube 12 toward the disc 5 causes the tapered end 11 of the shifting tube 12 to push the projecting members 7, 7' and the rollers 9 radially outward. Then being guided in the slots 4, 4', the outer ends of said projecting members 7, 7' engage the depressions 2', 2' on the inner surface of the clutch-casing 2, thereby engaging the clutch to effect power transmission. In order to disengage the clutch the shifting tube 12 is moved in the opposite direction. Then the rollers 9 slip down the tapered end 11 of the shifting tube 12, while the projecting members 7, 7' slide in the slots 4, 4' under the action of the springs $a, a'$, thereby disengaging the projecting members from the depressions in the clutch-casing 2. It will be noted that there is a clearance between the walls of the angular depressions 2' and the rounded edges of the members 7, 7'. This serves to provide a receptacle for dirt, excess grease, metallic particles, and the like, which may accumulate within the clutch and which would cause abrasion if frictionally gripped between the surfaces of the members 2 and 9.

Figure 3:
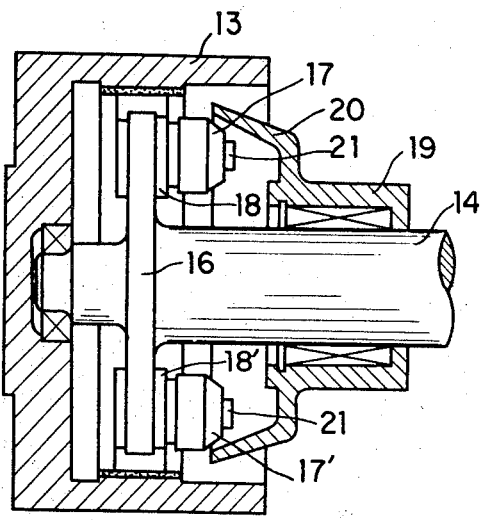
FIG. 3 is a longitudinal sectional view of another embodiment of this invention in which the mechanism for sliding the projecting members is frustoconical in shape.
Figure 4:
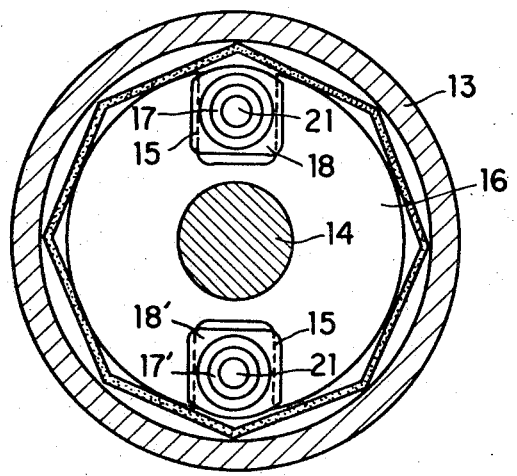
FIG. 4 is a cross-sectional view taken along the line A-A of FIG. 3.

SECOND EMBODIMENT ILLUSTRATED IN FIGS. 3 and 4

As seen in FIGS. 3 and 4, the inner surface of a clutch-casing 13 is provided with a short polygonal tube. The inner end of a driving shaft 14 carries a holding plate 16 provided with diametrically opposed guide slots 15, which receive projecting members 18, 18' carrying pins 21 which support rollers 17, 17'. The rollers 17, 17' face the inside surface of a frustoconical ring 20 carried by an operating tube 19 which slides on a driving shaft 14. When the operating tube 19 is moved in one direction horizontally along the driving shaft 14, the tapered surface on the inside of said frustoconical ring presses axially against the rollers 17, 17' and the projecting members 18, 18' attached thereto to stop the transmission of power. When the operating tube is moved in the other direction the released projecting members 18, 18' engage the depressions in the inner surface of the polygonal clutch-casing to permit the transmission of power.

In the mechanism described above, a clutch-casing having a series of depressions in its inner surface is fixed to a shaft. A holding plate with guide slots therein is mounted in the casing, and the guide slots in said holding plate slidably receive projecting members which engage the depressions in said clutch-casing. In this arrangement, engagement between the depressions in the clutch-casing and the projecting members can take place very smoothly without a hitch, and since the engagement is made between the inclined surfaces of the depressions and the ends of the projecting members, power transmission is attained reliably without slippage. Moreover, there is no possibility of vibration occurring even if the shaft centering is not perfect when there is a driving shaft and a driven shaft. When the projecting members are contacted by a tapered shifting tube, the power transmission can be connected or disconnected by mere displacement of the shifting tube, so the position of the clutch can be freely remote controlled hydraulically, pneumatically or electrically.

THIRD EMBODIMENT ILLUSTRATED IN FIGS. 7 and 8

Figure 5:
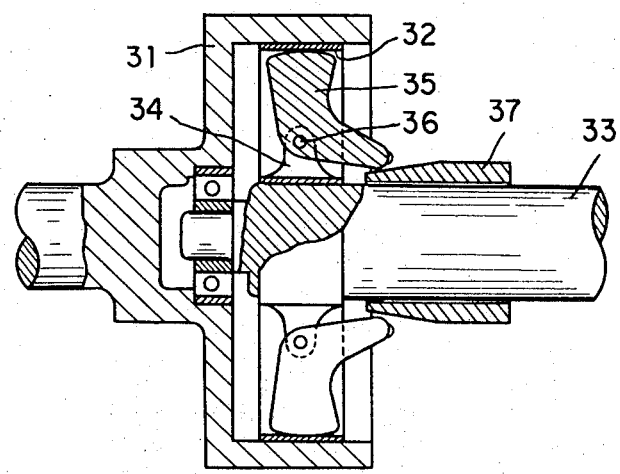
FIG. 5 is a longitudinal section taken through a clutch in which the projecting member is caused to rotate within a plane including the axis of the driving shaft.
Figure 6:
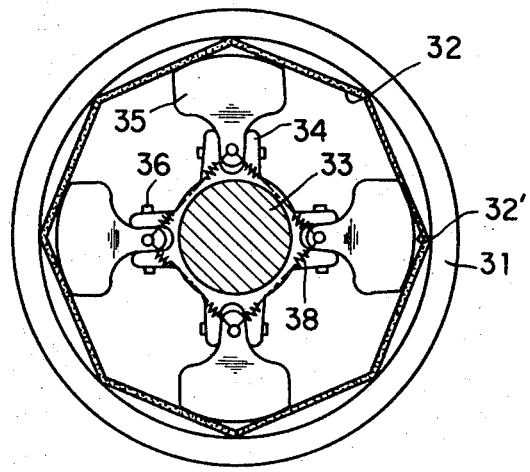
FIG. 6 is an end view of the clutch of FIG. 7.

In FIGS. 5 and 6, illustrating yet another embodiment of this invention, a plurality of depressions 32, 32' are provided on the inside of a clutch-casing 31. Plural sets of radially disposed mounting plates 34 carried by the driving shaft 33 project outwardly therefrom. L-shaped members 35 are pivotally attached to said mounting plates 34 by pivot pin 36 for swinging movement within a radial plane including the axis of the shaft. A shifting tube 37 having a tapered end and which is freely movable along the driving shaft 33 is kept in contact with the inner end of the members 35, while the spring 38 biases the inner ends of the members 35 toward said shifting tube.

In this example, the end of the driving shaft 33 is inside the clutch-casing 31, but the driving shaft 33 may enter the clutch-casing 31 through the bearing, or the end of the driving shaft 33 may be connected to the clutch-casing itself, so that the outer surface of the clutch-casing 31 may serve as a pulley.

When the spring is so arranged as to bias the inner end of the members 35 outward, a shifting tube having a flaring end with a tapered inner surface will be used.

In the above-mentioned clutch in which the projecting member is so mounted on the driving shaft that it can rotate within an axial plane and cooperates with the inner surface of a clutch-casing provided with a series of depressions, the rotation of said member and its engagement with the depression in the clutch-casing are extremely easy to produce and there is no slipping because the member contacts the clutch-casing at the depression. It is, moreover, simple in construction, easy to manufacture and very sturdy.

It will of course be appreciated that the foregoing embodiments have been given purely by way of example, and may be modified as to detail without thereby departing from the basic principles of the invention as set forth in the following claims.

I claim:

1. A clutch comprising a clutch-casing having a polygonal inner surface defining a series of depressions, a shaft mounted for rotation relative to said casing, a plurality of members carried by said shaft for radial movement between a position engaging and a position clear of said depressions, and means slidably mounted on said shaft for shifting said plurality of members radially between said positions, the surface of each member which engages a depression being rounded so that a clearance is defined between opposed portions of said rounded and polygonal surfaces when a member is engaged in a depression.

2. A clutch as claimed in claim 1, comprising a tube having a tapered surface portion and axially slidable on said shaft, and in which said radially movable members carry rollers positioned to be engaged by said tapered surface portion to shift said radially movable members between said positions.

3. A clutch as claimed in claim 2, in which said radially movable members are spring biassed toward the tapered surface on said tube.

4. A clutch as claimed in claim 1, comprising at least one bearing within said casing within which said shaft turns.

5. A clutch as claimed in claim 1, comprising a radially projecting plate fixed to said shaft, said plates being formed with radial slots and said radially movable members being slidably mounted in said slots.

6. A clutch as claimed in claim 1, comprising spring means which bias the radially movable members radially inward.

7. A clutch as claimed in claim 1, comprising a tube having an inner surface portion which tapers inwardly, said tube being axially slidable on said shaft, and said radially movable members carry rollers positioned to be engaged by said tapering surface portion to move said movable members between said positions.

8. A clutch as claimed in claim 1, comprising a cushioning material applied to the inside of said casing.

9. A clutch as claimed in claim 1; in which said movable members are pivotally mounted to swing between said positions in planes including the axis of said shaft.